US005315905A

United States Patent [19]

Karavadra

[11] Patent Number: 5,315,905

[45] Date of Patent: May 31, 1994

[54] METHOD AND APPARATUS FOR SHAPING ANTIPERSPIRANT STICKS AND SIMILAR PRODUCTS

[75] Inventor: Jiva R. Karavadra, Edison, N.J.

[73] Assignee: Bristol-Myers Squibb Company, New York, N.Y.

[21] Appl. No.: 159,075

[22] Filed: Nov. 29, 1993

Related U.S. Application Data

[63] Continuation of Ser. No. 35,527, Mar. 17, 1993, abandoned, which is a continuation of Ser. No. 173,980, Mar. 28, 1988, abandoned.

[51] Int. Cl.[5] .......................... B23D 17/00; B23D 23/02

[52] U.S. Cl. .......................... 83/13; 83/16; 83/23; 83/49; 83/51; 83/167; 83/171; 83/409.2; 83/412; 83/418; 83/597

[58] Field of Search .................. 83/13, 16, 23, 51, 167, 83/171, 409.2, 471, 491, 255, 412, 418, 597, 598, 599, 610, 611; 409/293, 303, 328, 309, 311, 313, 315

[56] References Cited

U.S. PATENT DOCUMENTS

| | | | |
|---|---|---|---|
| 756,741 | 4/1904 | Turnbull | 83/610 |
| 2,464,718 | 3/1949 | Potter et al. | 83/171 |
| 3,122,046 | 2/1964 | Baker et al. | 83/610 |
| 3,835,901 | 9/1974 | Jonsson | 144/34 R |
| 3,857,425 | 12/1974 | Wiklund | 144/34 R |
| 4,077,301 | 3/1978 | Brahm | 83/171 |
| 4,206,668 | 6/1980 | Creech | 83/610 |
| 4,459,886 | 7/1984 | Belzil | 83/598 |
| 4,841,826 | 6/1989 | Smith, III | 83/49 |

*Primary Examiner*—Scott Smith

*Attorney, Agent, or Firm*—Anthony M. Santini; Gene Warzecha

[57] ABSTRACT

A method and apparatus for shaping a solid antiperspirant stick composition. The antiperspirant composition is produced in a generally cylindrical form having an oval or elliptical cross-section and the method and apparatus disclosed herein form the exposed end of the stick into a domed shape. A shaping mechanism comprises three shaped and heated cutting edges, each of which is arcuately oscillated with respect to the end of the stick within the plane of the major axis of the oval or ellipse. One pre-cut cutting edge is oscillated in one direction and makes a cut partially into one side of the exposed end of the stick. Rough cut and finish cut cutting edges are then arcuately passed through the end of the stick in the opposite direction.

12 Claims, 5 Drawing Sheets

METHOD AND APPARATUS FOR SHAPING ANTIPERSPIRANT STICKS AND SIMILAR PRODUCTS

This application is a continuation of application Ser. No. 035,527, filed Mar. 17, 1993, now abandoned, which is a continuation of application Ser. No. 173,980, filed Mar. 28, 1988, now abandoned.

BACKGROUND OF THE INVENTION

1. Field of the Invention

The invention generally relates to devices for forming predetermined shapes in the ends of solid cylindrical articles of manufacture. More particularly, the invention relates to a cutting device for shaping one end of an oval cross-sectioned cylindrical solid antiperspirant product into a domed shape.

2. Description of the Prior Art

It is desirable to produce antiperspirant and other cosmetic and toiletry products in a form or shape adapted to comfortably apply the product to selected parts of the human body. While the invention is suitable for a variety of products which are moldable into a selected solid shape and used by being rubbed against a surface, this particular invention relates to shaping solid products such as antiperspirant or deodorant compositions. Solid forms of antiperspirant or deodorant products are generally produced by molding a liquid composition into a cylindrical solid stick form having a variety of cross-sections, usually circular, oval or elliptical. The stick is molded within a tubular dispenser shell which defines the cross-section of the product. Some mechanism is provided for advancing the stick from the shell and for retracting it after use.

This advancing/retracting mechanism comprises a platorm for holding one end of the stick and a means f or moving the platform relative to the container shell to expose the other end of the stick for use. While the product may simply be pushed from the shell, it is generally advanced by having the platform threaded on an axially positioned threaded rod which is rotated by means of a knurled knob. It is desirable that the end of the stick protruding from the shell and to be applied to the body be comfortably shaped, for example, generally hemispherical in the case of round sticks and domed in the case of oval or elliptically cross-sectional cylinders.

The dispenser shells may be filled using either the top-fill or the bottom-fill method. The bottom-fill method entails inverting the shell with a cap in place, filling it from the bottom with liquid product and then inserting the platform and its associated advancing components into the bottom of the shell so that the product supporting mechanism may set into the stick before it solidifies.

The top-fill method is simpler and more inexpensive than the bottom-fill method and requires fewer parts. In the top-fill method, the product container shell is entirely assembled except for the cap and liquid product is poured into the container from the top and sets into the supporting platform which is already inserted in the bottom of the container.

In both top-fill and bottom-fill methods additional steps need to be taken if the final product is desired to have a shaped exposed end. In a bottom-fill method, the desired shape may be produced by a shaping fitment which stays in the cap of the product and is removed by the customer prior to use. Alternatively, the product container could be filled with a shaped mold in place of the cap. The mold would then be removed after the product solidifies.

Producing a shaped exposed end with a top-fill method is more difficult and requires trimming or cutting the end of the solidified product into the desired shape. With known cylindrical antiperspirant sticks having a round cross-section, the exposed end may be trimmed using, for example, an arrangement of hemispherically shaped cutting edges revolving about the cylindrical axis. However, there is no known way to easily shape the end of a top-filled product if the cross-section of the cylindrical form is oval, elliptical or anything other than circular.

Accordingly, it is an object of this invention to produce a method and apparatus for trimming into a desired shape the end of a solid cylindrical form. It is a further object of this invention to produce a method and apparatus for shaping the end of a solid antiperspirant product having an oval or elliptical cross-section and forming the end into a generally domed shape having an arcuate surface profile along both major and minor axes of the oval or ellipse.

SUMMARY OF THE INVENTION

These and other objects of the invention are achieved by the preferred embodiment thereof which comprises a method of forming an end of an oval cross-sectional solid cylindrical form into a curved surface having a predetermined radius of curvature in at least one of the axes of the oval cross-section, the method comprising the steps of: (a) cutting partially into said end a first predetermined depth and distance with a first cutting means by causing same to move relative to said end in a first arcuate path about a first axis, said first cutting means having a first predetermined profile in a direction perpendicular to the direction of said arcuate path; and (b) cutting through said end to a second predetermined depth with a second cutting means by causing same to move relative to said end in a second arcuate path about a second axis, said second cutting means having a second predetermined profile and moving in a direction opposite to said first direction.

The method may further comprise (c) cutting through said end with at least one additional profiled cutting means spaced behind said second cutting means and moving relative to said form arcuately simultaneously with said second cutting means.

The method may further comprise retaining the cylindrical form in a manner enabling the end to be shaped and moving said first and second cutting means.

The foregoing method is, in the preferred embodiment of the invention disclosed herein, achieved by an apparatus for forming an end of an oval cross-sectional solid cylindrical form into a curved surface having a predetermined radius of curvature in at least one of the axes of the oval cross-section, the apparatus comprising means for holding said form in a manner enabling the end to be shaped; a first cutting means having a first predetermined profile; means for causing said first cutting means to move arcuately relative to said end to cut through said end, said relative motion of said cutting means being about an axis transverse to one of the major or minor axes of the oval cross-section.

DESCRIPTION OF THE PREFERRED EMBODIMENT

Figure 1:
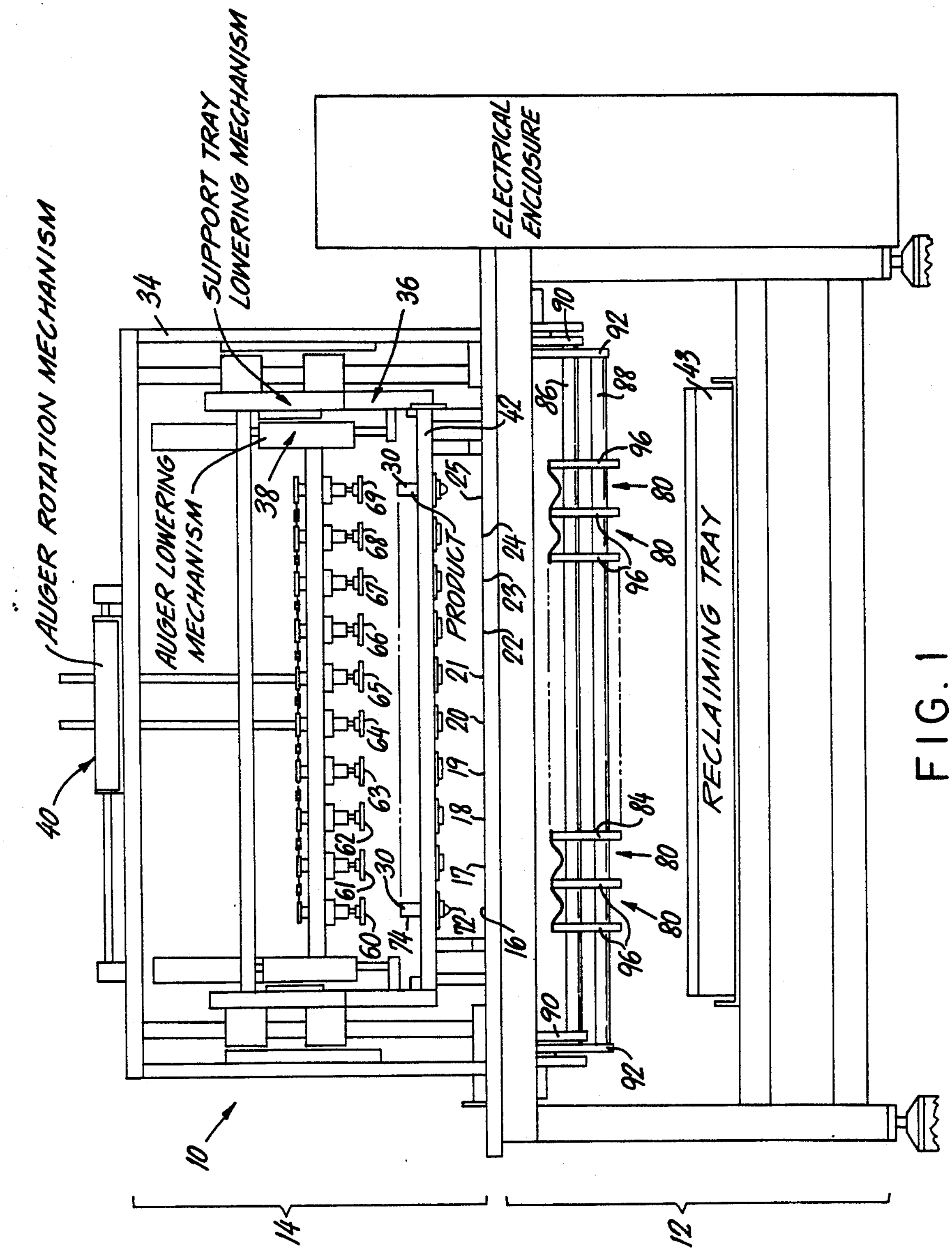
FIG. 1 is a schematic front elevational view of a shaping machine constructed in accordance with the principles of this invention. The machine is shown with various conventional drive and other components omitted for the sake of clarity.
Figure 2:
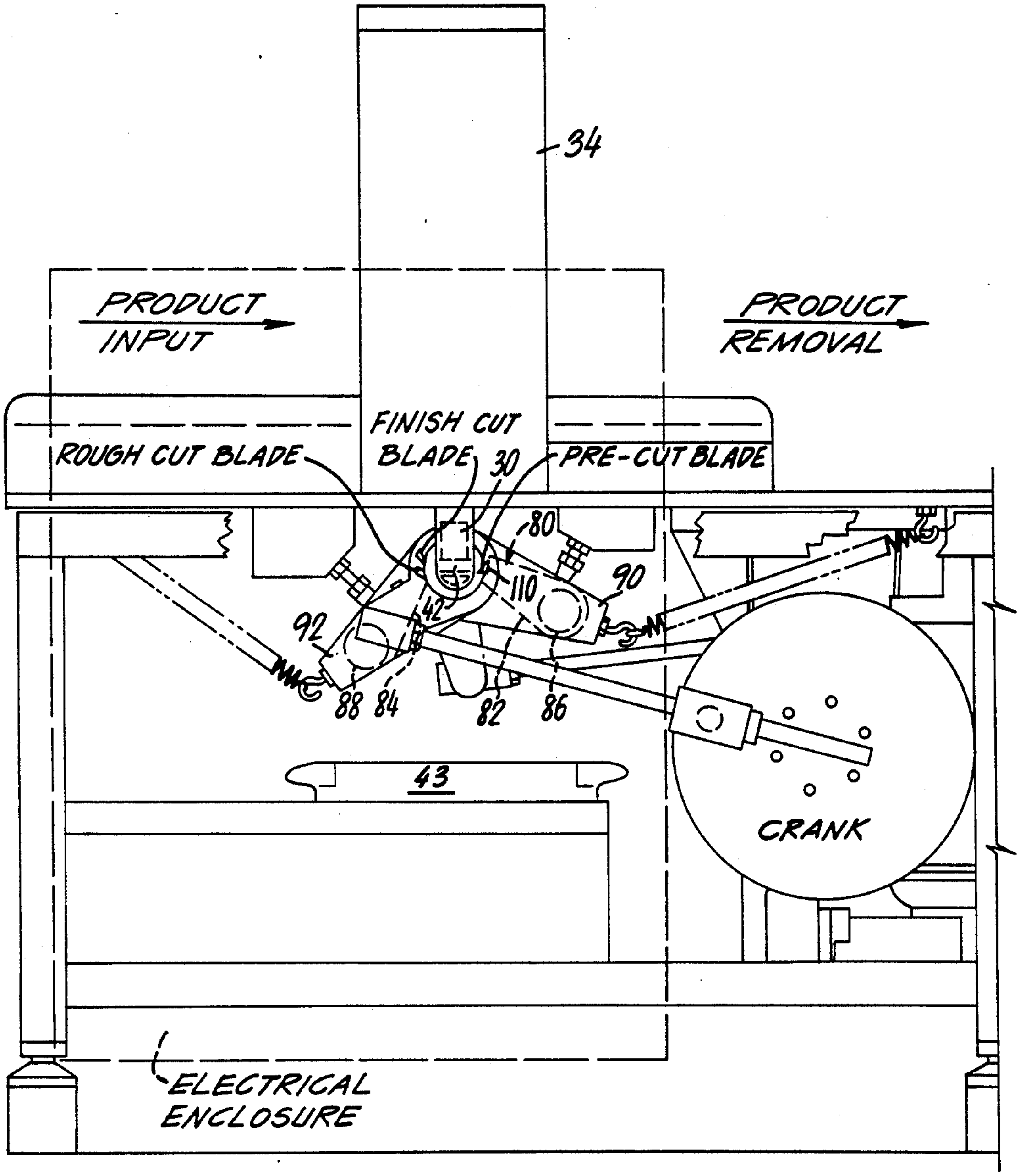
FIG. 2 is a right side elevational view of the machine shown in FIG. 1.

In FIGS. 1 and 2 there is shown a shaping machine 10 incorporating the principles of this invention. Machine 10 comprises a product shaping portion 12, a product feed portion 14 and a plurality of work stations 16 through 25, each work station designed to shape a single product 30. The machine shown is suitable for manually advancing ten products 30 simultaneously into position in corresponding work stations and then automatically shaping the exposed ends of each product.

Product handling portion 14 includes several common elements for simultaneously activating various components within work stations 16–25 in order to simultaneously act upon each product 30 in its respective work station. While these structures of product handling portion 14 do not necessarily form a part of this invention, a proper understanding of the operation of portion 14 is helpful in understanding the invention.

Product handling portion 14 comprises frame 34 supporting a support rack lowering mechanism 36, an auger lowering mechanism 38 and an auger rotation mechanism 40.

Figure 8:
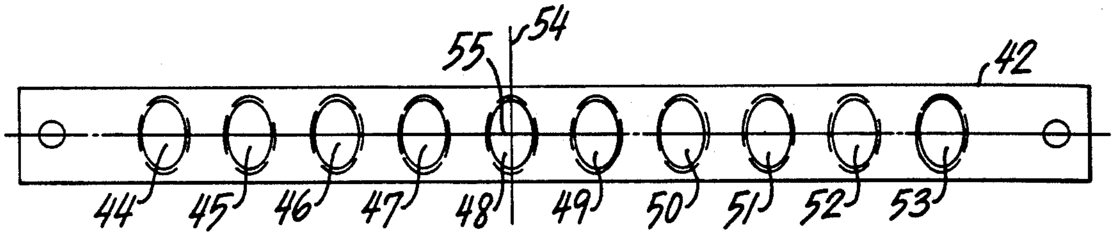
FIG. 8 is a schematic plan view of a tray portion of the machine shown in FIG. 1 used for holding the product to be shaped.

Rack lowering mechanism 36 comprises means for lowering rack 42 from a position at the bottom of product handling portion 14, and immediately above product shaping portion 12, into a position within portion 12 at which product is to be shaped, as will be understood below. Rack 42, best seen in FIG. 8, is provided with a plurality of apertures 44–53, each corresponding to a respective work station 16–25. Each of the apertures is shaped to receive and hold an oval or elliptically cross-sectional product 30 (having a major axis 54 and a minor axis 55) in an inverted position with the cap removed. Various cross-sectional shapes may be accommodated in machine 10 by changing the shape of the rack apertures accordingly. The preferred embodiment product 30, best seen in FIG. 9, includes a knurled thumb screw 70 for actually moving solid stick composition 72 within dispenser shell 74.

Auger lowering mechanism 38 comprises means for lowering and raising a subframe 56 which carries a plurality of rotatable gears 60–69. Each of the gears 60–69 is a part of a respective work station 16–25. Mechanism 38 is designed to bring each of the gears 60–69 into operative engagement with the thumb screw of a corresponding product 30 as will be better understood below.

Figure 9:
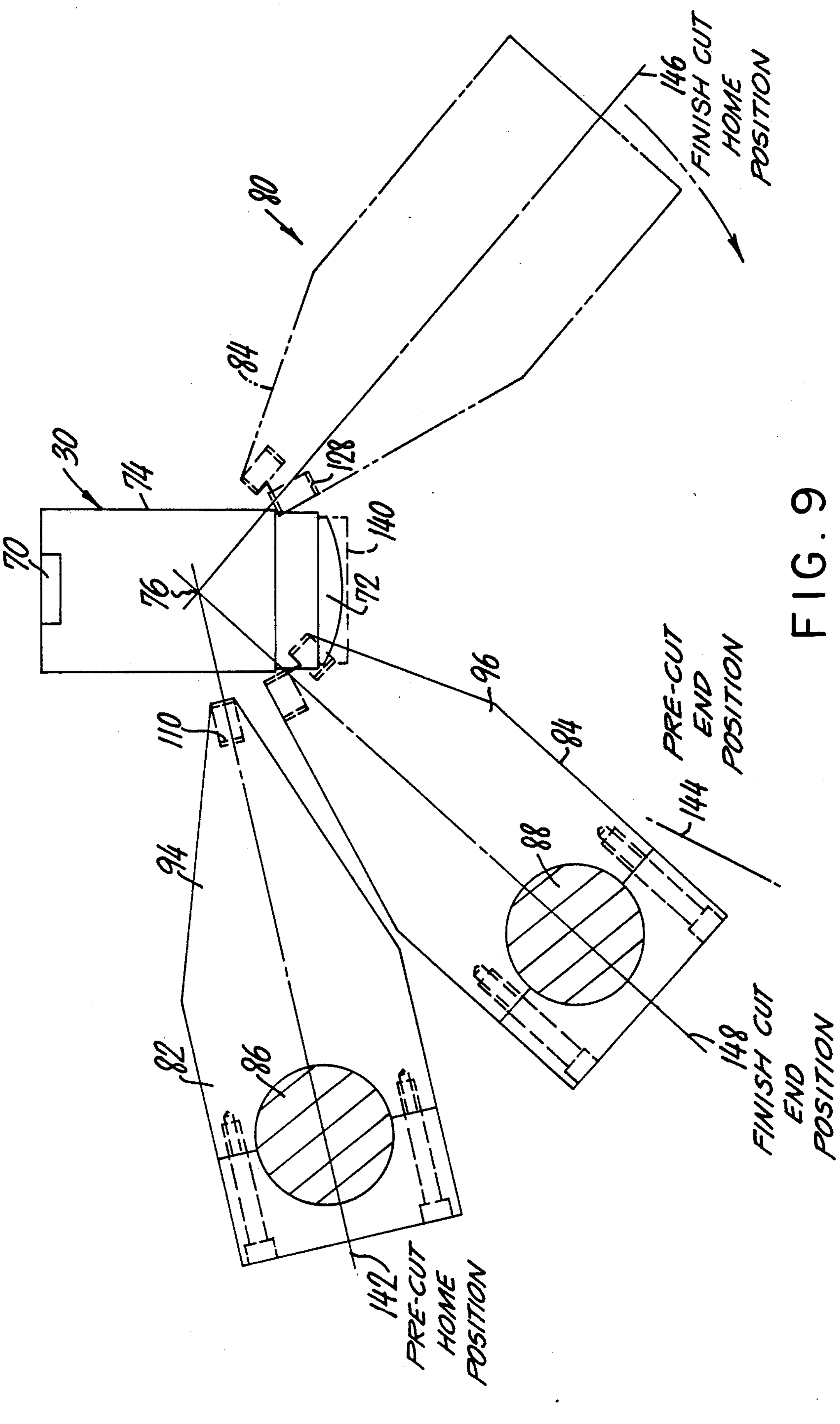
FIG. 9 is a schematic view of the arrangement of the supporting arms of FIGS. 3 and 4 relative to an actual product to be shaped.

Auger rotation mechanism 40 comprises means for simultaneously rotating all of the gears 60–69 after they have been engaged with the thumb screw of an associated product in order to advance the stick composition 72 of each product a predetermined amount out of its shell 74 to enable the shaping to occur. It will be understood that product 30 is formed using a top-fill method which results in the exposed end of the stick 140 being generally squared off, as best seen in FIG. 9.

Product shaping portion 12 is provided with a shaping device 80 at each work station 16–25. While the invention is operable with one profiled cutting edge being passed entirely through the end of the product on one pass, it has been found desirable when using the invention on certain stick compositions to initially use a pre-cut blade to cut partially into the product from one side adjacent an end and to use one or more additional cutting edges to make additional cuts of the end of the product while moving in a direction opposite to the pre-cut direction. Consequently, in the preferred embodiment, each shaping device 80 comprises a pre-cut member 82 and a finish cut member 84. All pre-cut members 82 are attached to a common transverse shaft 86 and all finish cut members 84 are attached to a common transverse shaft 88. Shafts 86 and 88 are mounted between pivotable end plates 90 and 92, respectively, which are each oscillated about their axes within predetermined arcuate ranges by a driving mechanism diagrammatically shown in FIG. 2. As will be further understood below by reference to FIG. 9, each of the shafts 86 and 88 is moved within respective predetermined arcs to cause the pre-cut members 82 to oscillate along a first predetermined arcuate path (between positions 142 and 144) and to cause the finish cut members 84 to oscillate along a second predetermined arcuate path. Each member 82 and 84 effectively oscillates about an axis 76 spaced from the end 140 to be shaped. It will be understood that the axis of rotation for each shaft 86 and 88 may be different if a different shape is desired.

Figure 3:
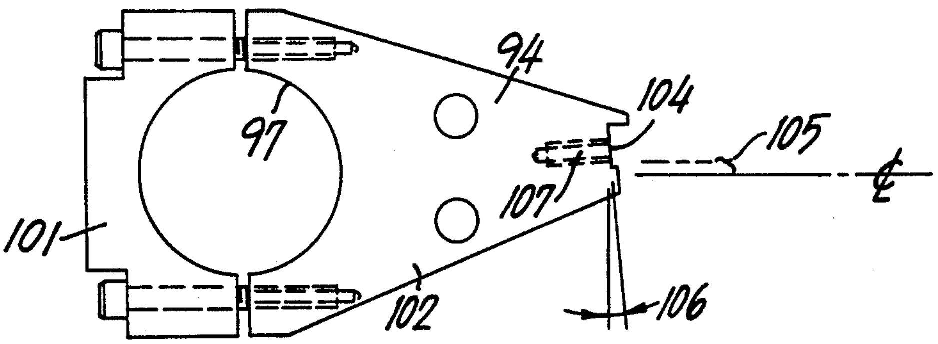
FIG. 3 is a side elevational view of one of two arms for supporting a pre-cut cutting edge in the shaping device used in the machine of FIG. 1.
Figure 4:
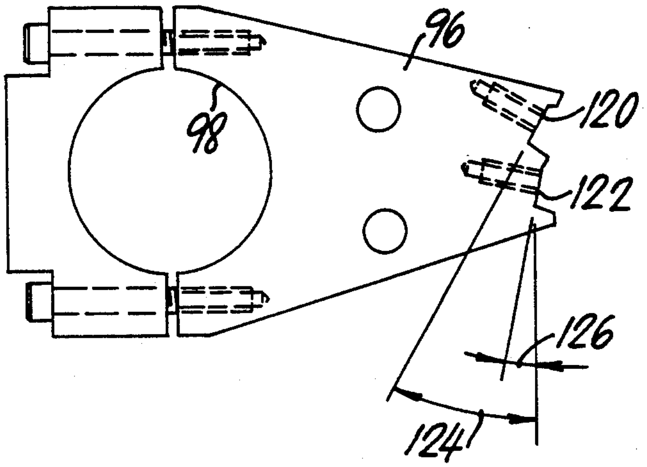
FIG. 4 is a side elevational view of one of two arms for supporting rough and final cutting edges in the shaping device used in the machine of FIG. 1.

It is possible to combine pre-cut member 82 and finish cut member 84 on one oscillating frame. However, in the preferred embodiment, these members are separately movable and each pre-cut member 82 comprises a pair of spaced pre-cut arms 94 and each finish member 84 comprises a pair of spaced finish cut arms 96, best seen in FIGS. 3 and 4, respectively. All arms are used to hold cutting blades or edges as will be understood below. Within each shaping section 80, while members 82 and 84 may actually comprise a pair of arms (94 and 96, respectively), in the preferred embodiment a single arm which is in between two adjacent shaping sections 80 is used in common, as best seen in FIG. 2. For example, the arm 96 between the shaping devices of work stations 16 and 17 is a support arm for the cutting edges associated with each work station. However, the invention may be best understood by describing the operation of each shaping section 80 as if it were comprised of a pair of arms 94 and a pair of arms 96.

Because it is desirable that the cutting edges be electrically heated, pre-cut arm 94 and finish arm 96 are each made of an electrically insulating material which in the preferred embodiment is a linen based phenolic resin. The electrical heating is accomplished by conducting a current into the end cutting edges (by means not shown). The various cutting edges are electrically conductive and their ends are overlapped as will be understood below.

Figure 7:
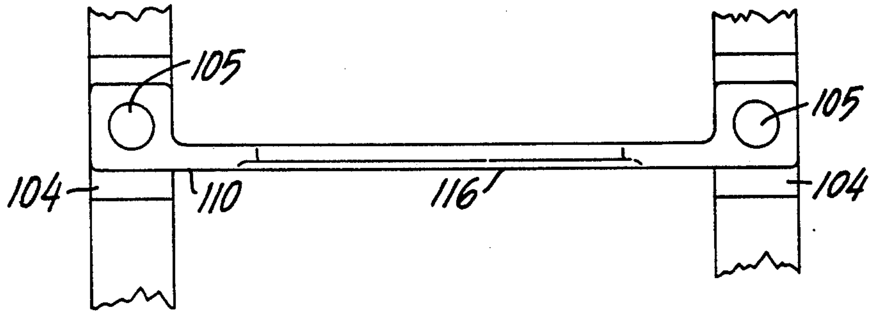
FIG. 7 is a plan view of the cutting blade shown in FIG. 5.

Each arm 94 and 96 is provided with an aperture 97 and 98, respectively, to enable the arm to be mounted on the corresponding shaft 86 or 88. Pre-cut arm 94 has a base portion 101, a top portion 102 and means to threadably attach the two portions together with a compression fit about common shaft 86. Top portion 102 is provided with a flattened mounting area 104 which is offset a predetermined distance 105 from the centerline of arm 94 and tilted at a predetermined angle 106. Each flattened area 104 supports one end of a precut cutting blade 110 best seen in FIG. 5. Each blade 110 is provided with flattened ends 112 and 114 and each end is provided with an aperture 105 for receiving a screw (not shown) to enable the blade to be attached to threaded bore 107 in flattened areas 104 of adjacent and spaced arms 94 best seen in FIG. 7. Blade 110 has a cutting edge 116 and a predetermined radius 118 designed to cut a desired profile into the end of the product.

Figure 5:
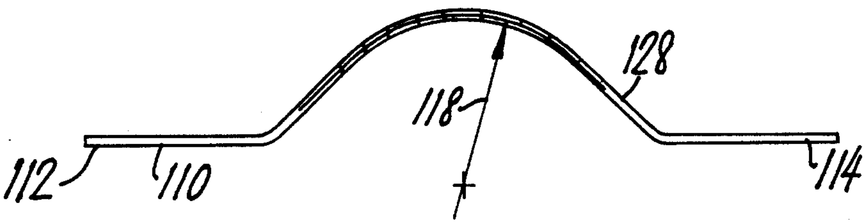
FIG. 5 is a front elevational view of a pre-cut cutting edge used in the machine of FIG. 1.
Figure 6:
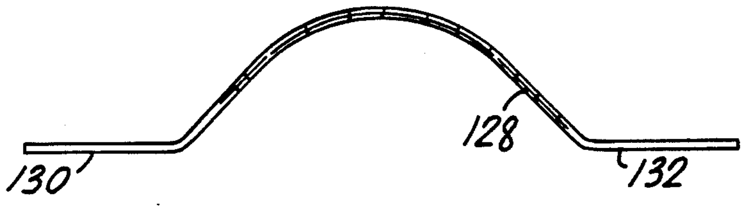
FIG. 6 is a front elevational view of a rough cut cutting edge used in the machine of FIG. 1.

Finish arm 96 is constructed similarly to arm 94 and will, therefore, not be described in detail. However, it should be noted that the top portion of arm 96 is provided with a pair of flat portions 120 and 122 each situated a predetermined respective distance from the centerline of the arm and each situated at predetermined angles 124 and 126, respectively. Flattened area 120 is provided for receiving a rough cut blade and flattened area 122 is provided for receiving a finish cut blade. The profile of the finish cut blade is shown in FIG. 5, it being understood that the profile of the blade used on pre-cut arm 94 may be substantially the same as the profile of the finish blade used on arm 96. The profile of the rough cut blade is shown in FIG. 6. The rough cut blade 128 is provided with flattened ends 130 and 132 to enable it to be mounted to spaced arms 96 in a manner similar to that described above with respect to blade 110. In the preferred embodiment, rough cut blade 128 has a larger radius than blade 110, is slightly flatter and is positioned on spaced arms 96 in order to make a relatively deep cut in the end of the product so that the finish cut blade need only make a relatively shallow cut. This avoids "pulling" any of the stick composition out of the surface of the product which would produce either a rough or pitted shaped end.

It will be understood that the placement of the flattened areas on arms 94 and 96, and the consequent angles of attack of the cutting edges relative to the end of the product are parameters which may be varied depending upon the characteristics of the product being shaped.

The operation of the method and apparatus of this invention is best seen in FIG. 9 which diagrammatically shows the oscillatory cutting action of each shaping device 80. FIG. 9 represents the motion of the cutting edges of shaping portion 80 when the product 30 is lowered into shaping portion 12 in order to place the end of the stick composition in the path of the cutting edges. The operating cycle of machine 10 begins with the insertion of a plurality of products 30 in an inverted position into rack 42 which is then manually pushed (to the right as shown in FIG. 2) into the bottom of product handling portion 14 into position beneath gear supporting frame 56 as viewed in FIG. 1. Rack 42 is then lowered by rack moving mechanism 36 into a predetermined position to place the ends of each product 30 adjacent a respective shaping device 80. Gear carrying frame 56 is also lowered in order to place each gear 60–69 into engagement with a corresponding knurled knob 70 of a product 30 and the gears 60–69 are simultaneously rotated in order to rotate knurled knobs 70 to advance the stick composition within product 30 into a position 140. It should be understood that in position 140 the stick composition will protrude from the container of product 30 an amount sufficient to enable the shaping operation of the invention to proceed without interference from the shell containing the stick. After rack 42 has been lowered and the stick composition within each product 30 has been advanced, shaft 86 carrying all pre-cut arms 82 is rotated about axis 76 through an arc sufficient to cause all arms 82 to move from home position 142 to pre-cut position 144. It will be understood that this produces a shaped surface at a predetermined depth and for a predetermined distance partially into the end of product 140. Shaft 88 carrying all finish cut arms 84 is then rotated in the opposite direction about axis 76 through an arc sufficient to move all arms 84 from a home position 146 to a final position 148. Pre-cut arms 82 may be pushed out of the way in this process or may have been moved away independently. The excess material trimmed from the end of the product falls into a reclaiming tray 43 for re-use or discard. Rack 42 is then raised, all components are then retracted to their beginning, home-positions and rack 42 is then pushed toward the output side of the machine (on the right side of frame 34 in FIG. 2) by a newly loaded rack being pushed into position.

It will be understood by those skilled in the art that the invention would be operable by moving any appropriately constructed cutting means relative to the cylindrical end to be shaped. Either the cutting means or the product may be moved relative to the other. The cutting means may be straight or curved knife edges, gratings, screens or any number of various devices depending upon the material being cut or shaped.

It will also be understood by those skilled in the art that numerous other modifications and improvements may be made to the preferred embodiment of the invention disclosed herein without departing from the spirit and scope thereof.

What is claimed is:

1. A method of shaping one end of a solid antiperspirant/deodorant product comprising the steps of:

(a) providing a plurality of oval cross-sectional solid antiperspirant/deodorant products to be shaped, each contained within a product container having a screw mechanism to advance the product from the container;

(b) retainably loading said plurality of products in an inverted position on a product-carrying rack of a product shaping apparatus;

(c) movably placing said rack into alignment with a product advancing means of said apparatus;

(d) engaging said product advancing means with the screw mechanism of said containers to advance said one end of each of said plurality of products from said container an amount sufficient to enable shaping to proceed without interference from said container;

(e) cutting through each of said advanced product ends with a knife means in an arcuate path to provide each of said products with a dome-shaped surface; and moving said dome-shaped products to an output area of said apparatus.

2. The method of claim 1 further comprising facing said one end of each of said products downward with said end extending a predetermined distance below said rack.

3. The method of claim 2 further comprising aligning said rack below said product advancing means.

4. The method of claim 3 further comprising lowering said product advancing means to engage with said screw mechanism of said container.

5. The method claim 1 comprising providing a gear mechanism as said product advancing means.

6. The method of claim 1 comprising arcuately moving said knife means relative to said products.

7. The method of claim 1 comprising providing a curved cutting edge on said knife means.

8. An apparatus for shaping one end of a solid antiperspirant/deodorant product into a domed shape wherein the product comprises an oval cross-sectional material contained within a product container having a screw mechanism to advance the product from the container, the apparatus comprising:

(a) a product-carrying rack for retaining a plurality of said products and product containers loaded thereonto;

(b) a product advancing means;

(c) means to align and engage said product advancing means with the screw mechanism of each of said plurality of product containers to advance said one end of each of said products from said container an amount sufficient to enable shaping to proceed without interference from said container;

(d) knife means for cutting through each of said advanced product ends;

(e) means for providing arcuate motion between said knife means and said advanced product ends to provide each of said products with a dome-shaped surface;

(f) means for collecting excess product cut from said advanced product ends; and (g) an output area for receiving said dome-shaped products.

9. The apparatus of claim 8 further comprising a product input area where said products are loaded onto said rack.

10. The apparatus of claim 8 wherein said product advancing means is a gear mechanism.

11. The apparatus of claim 8 wherein said knife means is arcuately moved relative to said products.

12. The apparatus of claim 8 wherein said knife means has a curved cutting edge.

* * * * *